(12) United States Patent
Johnson

(10) Patent No.: US 11,672,246 B2
(45) Date of Patent: Jun. 13, 2023

(54) WATERFOWL DECOY TUBULAR APPARATUS AND METHOD OF USING SAME

(71) Applicant: William S. Johnson, Kinder, LA (US)

(72) Inventor: William S. Johnson, Kinder, LA (US)

( * ) Notice: Subject to any disclaimer, the term of this patent is extended or adjusted under 35 U.S.C. 154(b) by 366 days.

(21) Appl. No.: 16/822,517

(22) Filed: Mar. 18, 2020

(65) Prior Publication Data

US 2020/0296953 A1 Sep. 24, 2020

Related U.S. Application Data

(60) Provisional application No. 62/822,337, filed on Mar. 22, 2019.

(51) Int. Cl.
*A01M 31/06* (2006.01)

(52) U.S. Cl.
CPC .................................. *A01M 31/06* (2013.01)

(58) Field of Classification Search
CPC .................................................... A01M 31/06
See application file for complete search history.

(56) References Cited

U.S. PATENT DOCUMENTS

| | | | | |
|---|---|---|---|---|
| 4,114,553 A * | 9/1978 | Zidek | ...................... | B63B 21/00 114/230.29 |
| 7,347,024 B1 * | 3/2008 | Vest | ...................... | A01M 31/06 43/3 |
| 8,006,465 B1 * | 8/2011 | Albert, III | ............ | A01M 31/06 53/413 |
| 9,044,006 B1 * | 6/2015 | O'Neil | .................. | A01M 31/06 |
| 9,314,012 B1 * | 4/2016 | Galloway | ............. | A01M 31/06 |
| 10,336,569 B1 * | 7/2019 | Lehman | ................ | A01M 31/06 |
| 2005/0067449 A1 * | 3/2005 | Jauvin | .................... | A63B 57/20 224/660 |
| 2009/0229535 A1 * | 9/2009 | Lind | ...................... | A01K 15/02 119/707 |
| 2010/0011650 A1 * | 1/2010 | Leonards, Sr. | ....... | A01M 31/06 43/3 |
| 2013/0192536 A1 * | 8/2013 | Lohmann | ............. | A01K 15/025 119/707 |
| 2013/0276689 A1 * | 10/2013 | Marshall | ................ | F16G 11/14 114/219 |
| 2016/0255945 A1 * | 9/2016 | Harding | ................ | A01M 31/06 |
| 2019/0090456 A1 * | 3/2019 | Dominguez | ......... | A01K 15/025 |

* cited by examiner

*Primary Examiner* — Monica L Perry
*Assistant Examiner* — Brittany A Lowery
(74) *Attorney, Agent, or Firm* — Ted M. Anthony; Sarah B. Dupont

(57) ABSTRACT

A hunting and wildlife waterfowl decoy apparatus comprising a tubular member and a cord member, wherein the tubular member and the cord member cooperate in order to create a tensional force and a locking mechanism. A waterfowl decoy tubular apparatus for use in keeping a plurality of waterfowl decoy cords in a substantially tight and taught orientation, thereby holding a plurality of decoys in a secure manner and preventing the decoy cords, and thus the decoys, from entangling during transportation or storage.

5 Claims, 4 Drawing Sheets

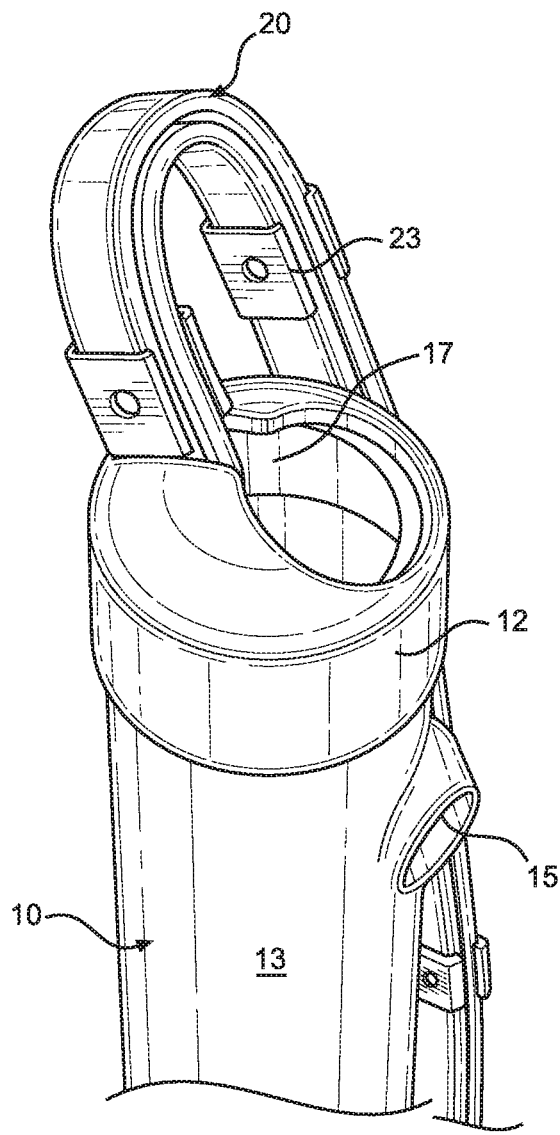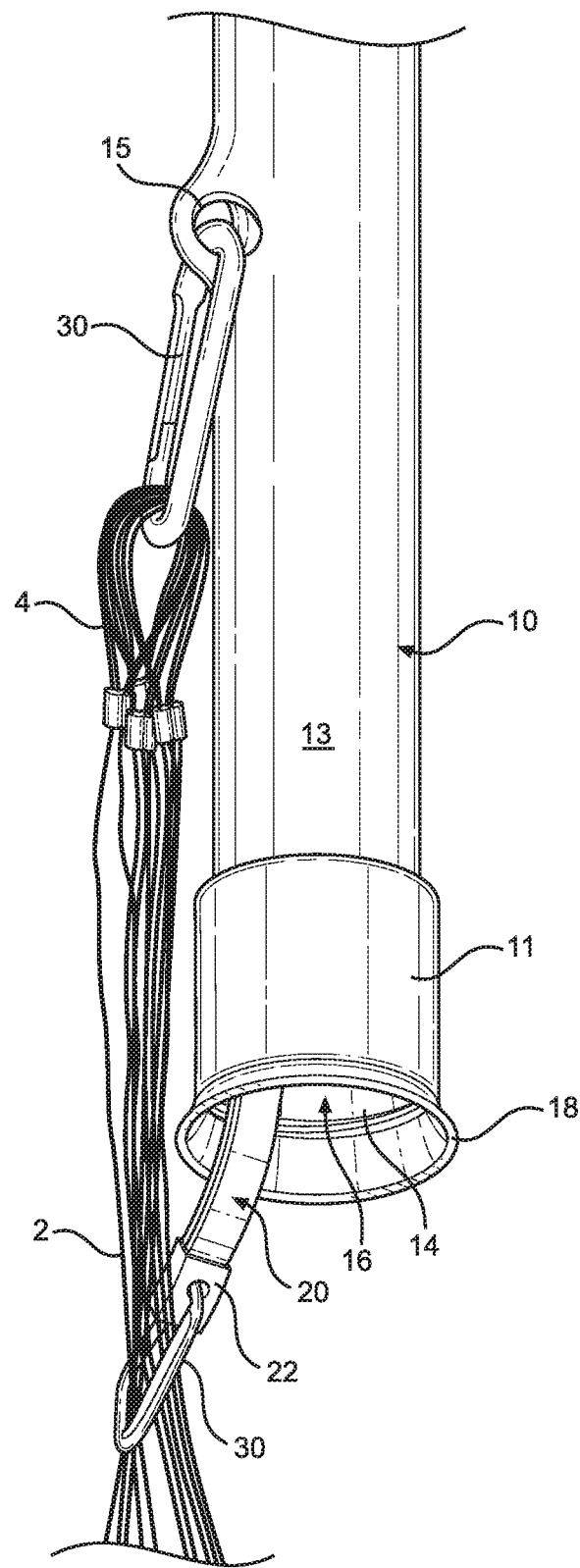
FIG. 3
FIG. 4

WATERFOWL DECOY TUBULAR APPARATUS AND METHOD OF USING SAME

CROSS REFERENCES TO RELATED APPLICATION

Priority of U.S. Provisional Patent Application Ser. No. 62/822,337, filed Mar. 22, 2019, incorporated herein by reference, is hereby claimed.

STATEMENTS AS TO THE RIGHTS TO THE INVENTION MADE UNDER FEDERALLY SPONSORED RESEARCH AND DEVELOPMENT

None

BACKGROUND OF THE INVENTION

Field of the Invention

The present invention pertains to a hunting and wildlife waterfowl decoy apparatus for use in transporting and storing a plurality of waterfowl decoys, while simultaneously preventing any entanglement of a plurality of cords of said waterfowl decoys. More particularly, the present invention pertains to a waterfowl decoy tubular apparatus for use in keeping said waterfowl decoy cords in a substantially tight and taught orientation, thereby holding said decoys in a secure manner and preventing said cords, and thus said decoys, from entangling during transportation or storage.

Brief Description of the Prior Art

Waterfowl decoys are commonly used in the wildlife and hunting industry. These decoys are typically used as a means to lure live animals into a particular location in order to better a hunter's chances of having a higher waterfowl, or duck, activity, and thus, a higher likelihood of having a successful hunt. Moreover, the decoys generally have a cable, or a cord, of varying lengths attached to said decoys in order to be able to anchor the decoys, and thus, keep the decoys in place. In order to get said decoys into a particular location, the hunters have to transport and relocate the decoys from one location to another quite frequently. Since decoys are generally used in relatively large numbers, it is very easy for the cords attached to the decoys to become entangled with one another during transport, relocation, or storage. As a result, this causes additional steps and additional time to be taken to attempt to organize the decoys and the cords prior to relocation or storage.

Conventional methods of attempting to keep waterfowl decoys and decoy cords organized involve wrapping the cords in a particular manner around the decoys and then placing the decoys in a bag, or using a variety of different devices that still unsuccessfully attempt to keep the cords from entangling with one another. As such, there is a need for a device that is able to organize, store, and/or transport a variety of waterfowl decoys and cords in an easy and efficient manner in order to avoid twisting and tangling of said decoy cords.

SUMMARY OF THE INVENTION

The waterfowl decoy tubular apparatus of the present invention comprises a substantially hollow tubular structure having an inner diameter, or surface, and an outer diameter, or surface. Said inner diameter further comprises a substantially ridged wall. Additionally, said hollow tubular structure comprises a first end and a second end, wherein said first end is a substantially fully open end and said second end comprises a substantially smaller opening having a substantially keyhole-like style, or any other similarly shaped opening. Moreover, said tubular structure of the present invention comprises a plurality of attachment points located on an outer surface of said tubular, wherein said attachment points each comprise a bore for use in allowing an attachment device (described below) to connect to said outer surface of said tubular.

The present invention further comprises a knotted cord having a first end and a second end, wherein said knotted cord is able to axially extend through an interior of said hollow tubular structure. Additionally, said present invention comprises a plurality of attachment devices (such as, for example, clips or shackles) that are attachably connected to both said first end and said second end of said knotted cord. By way of illustration, but not limitation, said attachment devices generally comprise a carabiner clip; however, it is to be observed that additional attachment means may also be used.

Moreover, said waterfowl decoy cords each comprise a first end and a second end, whereby in a preferred embodiment of the present invention, an additional attachment device, or carabiner clip, attachably connects to both ends of said decoy cords and attachably connects to one of said clip attachment points located on said exterior surface of said tubular structure.

One of said attachment devices that is located on an end of said knotted cord, which extends axially through said opening of said tubular structure, can clip around a body of said decoy cords. The knotted cord is then pulled through said tubular structure and out through said keyhole-like opening until said decoy cords are pulled in a substantially tight and taught manner. As a result, said decoy cords remain in an extended and taught orientation as said cords are encompassed within said tubular structure. Said knotted cord is then placed in an elongated portion of said keyhole-shaped opening in order to be secured and thus allow for easier transport and cleaner storage of said waterfowl decoys without said decoy cords being able to entangle within each other.

The waterfowl decoy tubular apparatus of the present invention comprises a variety of different advantages. For example, said apparatus keeps said decoy cords tangle-free, while providing substantially easy and tangle-free storage and transportation (Boat, UTV, During Season and Post Season). Additionally, the apparatus of the present invention makes for relatively easier decoy deployment in the field and protects decoys from damage by not allowing them to continually collide with one another. A single person is able to manually carry a greater number of decoys and is able to collect a large number of decoys faster and easier. The waterfowl decoy tubular apparatus of the present invention is able to be utilized with a variety of different cord lengths, depending on a user's needs. Generally, waterfowl decoy cord lengths can be anywhere from two feet (2') to six feet (6') in length. Thus, depending on the length of said cord, said waterfowl decoy tubular apparatus allows for a storage length space that can be up to ⅓ less than the actual length of said decoy cord and other conventional methods of storage.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

FIG. 3 depicts a detailed side view of a preferred embodiment of a second end of a waterfowl decoy tubular apparatus of the present invention.

FIG. 4 depicts a detailed side view of a preferred embodiment of a first end of a waterfowl decoy tubular apparatus of the present invention.

DETAILED DESCRIPTION OF A PREFERRED EMBODIMENT

Figure 1:
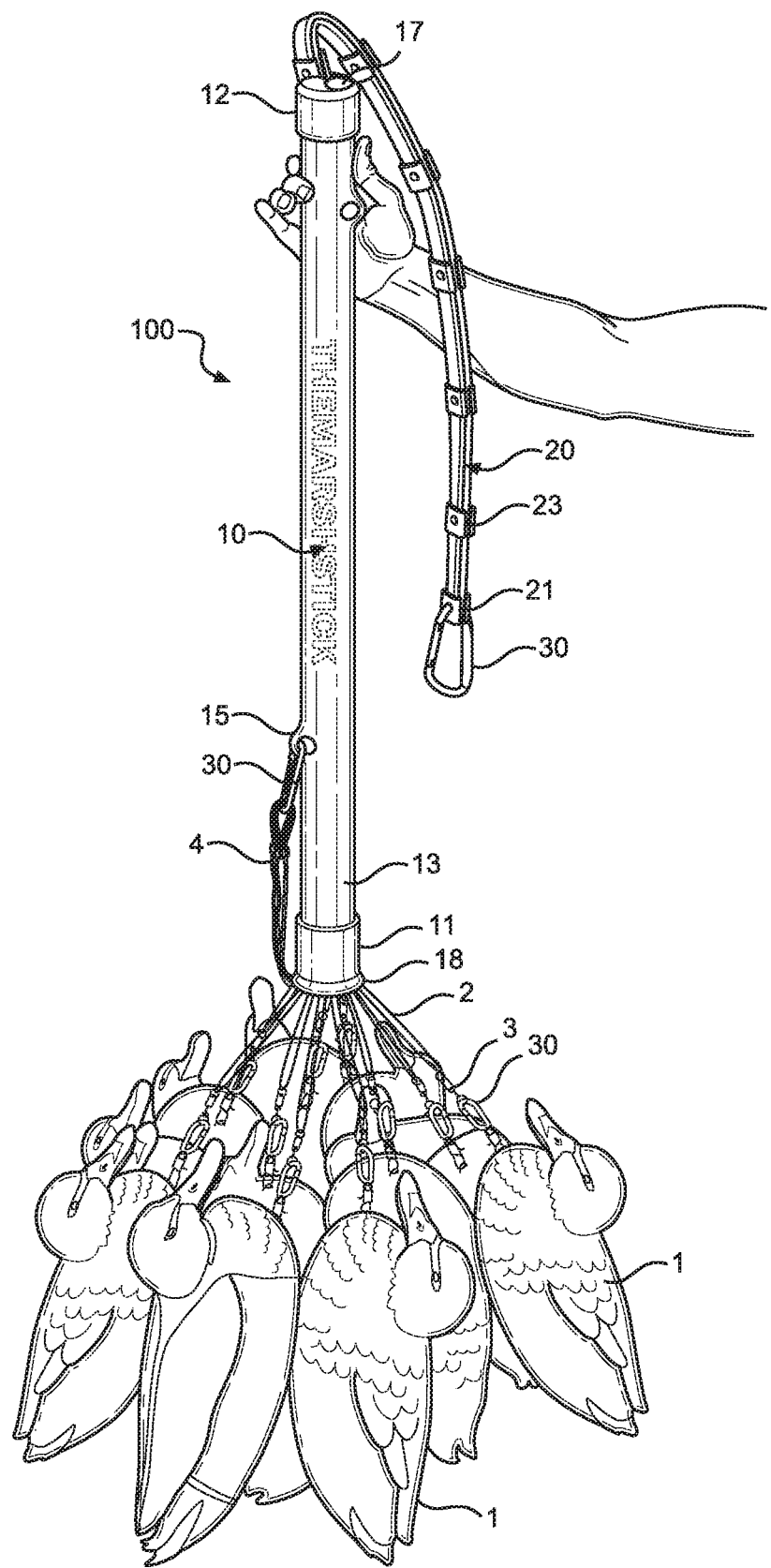
FIG. 1 depicts a side view of a preferred embodiment of a waterfowl decoy tubular apparatus of the present invention holding a plurality of duck decoys.

Referring to the drawings, FIG. 1 depicts a side view of a preferred embodiment of a waterfowl decoy tubular apparatus 100 of the present invention securely holding a plurality of waterfowl decoys 1 and keeping a plurality of waterfowl decoy cords 2 in a substantially organized manner. Said waterfowl decoy tubular apparatus 100 comprises a tubular structure 10, or device, wherein said tubular device 10 comprises an inner surface 14, an outer surface 13, a first end 11 and a second end 12. As such, said inner surface 14, outer surface 13, first end 11, and second end 12 cooperate to form an interior channel 16.

Said first end 11 comprises a substantially fully open end, and said second end 12 comprises a substantially smaller opening having a keyhole-like shape 17, or any other similarly shaped opening. Additionally, said outer surface 14 of said tubular device 10 comprises a plurality of bores 15, or attachment points, wherein said attachment points 15, or bores, are for use in allowing an attachment device (as further described below) to connect to said outer surface 14 of said tubular device 10.

In a preferred embodiment, said waterfowl decoy tubular apparatus 100 comprises a cord member 20 having a first end 21 and a second end 22, wherein said cord 20 further comprises a plurality of notches 23, or knots, along a length of said cord 20 from said first end 21 to said second end 22. Said knotted cord 20 can be manufactured from a substantially flexible, elastic material, such as, for example, a rubber material, or any other similar material exhibiting like characteristics having elasticity, wherein said flexible material provides elasticity in order to enable to said cord member 20 to be able to stretch, while having a substantially constant tensional force and resistance acting upon said cord 20 in response to axial extension. Said cord member 20 is able to be positioned within and axially extend within said interior channel 16 of said tubular device 10. Said first end 21 of said cord member 20 axially extends and lengthens through said interior channel 16 of said tubular device 10 and is able to exit out of said second end 12 of said tubular member 10. Said second end 22 of said cord member 20 is able to connect to said decoys 1 and said decoy cords 2 and then axially move and extend within said interior channel 16 through said first end 11 of said tubular member 10.

Still referring to FIG. 1, in the preferred embodiment, said waterfowl decoy tubular apparatus 100 of the present invention comprises a plurality of attachment devices 30 (such as, for example, a clip or a shackle). Said attachment devices 30 are attachably connected to both said first end 21 and said second end 22 of said cord member 20. By way of illustration, but not limitation, said attachment devices 30 generally comprise a carabiner clip; however, it is to be observed that any other similar or additional attachment means may also be used.

Additionally, said decoy cords 2 each comprise a first end 3 and a second end 4. In the preferred embodiment of the present invention, an attachment device 30, or a carabiner clip, attachably connects to both said first end 3 and said second end 4 of said decoy cords 2, wherein a first end 3 of said decoy cord 2 is attachably connected to said decoy 1 and a second end 4 of said decoy cord 2 is used to attachably connect to said waterfowl decoy tubular apparatus 100 of the present invention. As such, said second end 4 of said decoy cord 2 attachably connects to said attachment point 15, or bore, located on said outer surface 14 of said tubular member 10 of said waterfowl decoy tubular apparatus 100 by way of said attachment device 30, or carabiner clip.

In the preferred embodiment, said second end 22 of said cord member 20 is able to securely and attachably connect to said decoy cords 2 by way of said attachment device 30, whereby said attachment device 30 on second end 22 of cord member 20 is able to securely fasten around said decoy cords 2, thereby holding said decoy cords 2 together in a substantially unified manner. Said first end 21 of said cord member 20 is then axially pulled, thereby pulling said cord member 20 through interior channel 16 of tubular member 10. Said first end 21 of said cord member 20 is then axially pulled out of said second end 12 of said tubular member 10 through said keyhole opening 17 until said decoy cords 2, and thus said decoys 1, are pulled in a substantially taught and tight manner. As a result, said decoys 1 are able to remain in a substantially extended and secure orientation, while said decoy cords 2 are encompassed and folded within said interior channel 16 of said tubular member 10. Moreover, said keyhole opening 17 on said second end 12 of said tubular member 10 comprises a locking mechanism, wherein said locking mechanism creates tension in said cord member 20, thereby allowing said cord member 20 to remain substantially tight and secure.

Figure 2:
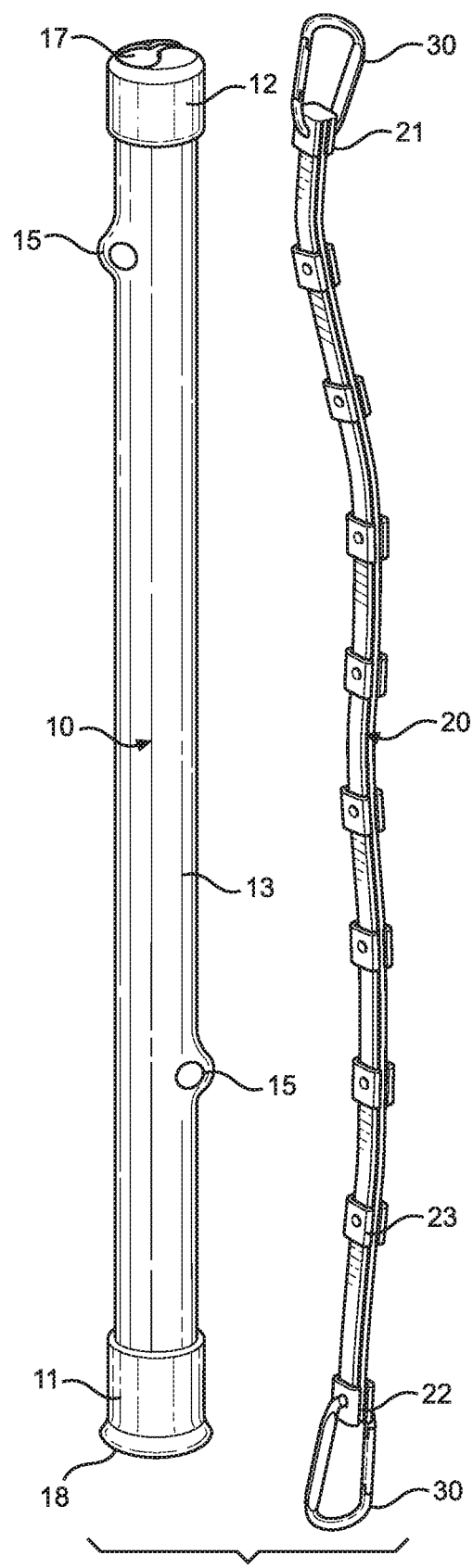
FIG. 2 depicts a side view of a preferred embodiment of a waterfowl decoy tubular apparatus of the present invention in a deconstructed configuration.

FIG. 2 depicts a side view of a preferred embodiment of said waterfowl decoy tubular apparatus 100 of the present invention in a deconstructed configuration, generally comprising a tubular member 10 and a cord member 20. Said tubular member 10 comprises a substantially hollow rod-like structure, having first end 11, second end 12, outer surface 13, and inner surface 14. First end 11, second end 12, outer surface 13, and inner surface 14 cooperate to form interior channel 16. Said first end 11 of said tubular member 10 comprises a substantially circular opening, wherein said decoy cords 2 are able to enter said tubular structure 10. Moreover, said first end 11 of said tubular member 10 comprises a substantially beveled edge 18, thereby preventing said cords 2 from fraying or snapping while in contact with said tubular member 10. Said second end 12 of said tubular member 10 comprises a substantially conical configuration, having a keyhole like opening 17. Said keyhole opening 17 and conical configuration help create and maintain said locking mechanism for said cord member 20.

In the preferred embodiment, said outer surface 13 of tubular member 10 comprises said attachment points 15, or bores, wherein said first end 3 of said decoy cords 2 are able to attachably connect to said tubular member 10. Said outer surface 13 of tubular member 10 comprises at least two separate attachment points 15. As such, depending on which exterior attachment point 15 connection on said tubular member 10 is being used, said waterfowl decoy tubular apparatus 100 of the present invention is able to accommodate and utilize a variety of different lengths of cords 2, as necessary.

Still referring to FIG. 2, waterfowl decoy tubular apparatus 100 of the present invention comprises an elastic cord member 20. Said cord member 20 comprises a first end 21, a second end 22, and a plurality of knots 23 equidistantly spaced apart along a length of said cord 20. Said first end 21 and said second end 22 each comprise an attachment device 30, such as, for example, a carabiner clip, wherein said attachment device 30 on said second end 22 of said cord member 20 allows said cord member 20 to attachably connect to and secure a plurality of decoy cords 2.

Said cord member 20 comprises an elongate elastic device that generates a substantially constant tensional force in response to axial extension. As such, elastic cord member 20 is able to be axially extended within said interior channel 16 of said tubular member 10, wherein said first end 21 of said cord member 20 exits said second end 12 of said tubular member 10 first, and then, depending on a length of said decoy cords 2, said second end 22 of said cord member 20 is able to pull said decoy cords 2 through said first end 11 of said tubular member 10 and into said interior channel 16 as far as possible in order to create a tight and secure hold on said decoy cords 2, and thus said decoys 1. As a result, said cord member 20 is then able to hook and secure within said keyhole opening 17 of said second end 12 of said tubular member 10, thereby creating said locking mechanism, and thus, holding said cord member 20 and said decoy cords 2 in a secure, tight, and organized manner.

FIG. 4 depicts a detailed side view of a preferred embodiment of a first end 11 of tubular member 10 of said waterfowl decoy tubular apparatus 100 of the present invention. Said first end 11 of said tubular member 10 comprises a substantially circular opening, wherein said decoy cords 2 are able to enter into said interior channel 16 of said tubular structure 10. Moreover, said first end 11 of said tubular member 10 comprises a substantially beveled edge 18, thereby preventing said decoy cords 2 from fraying or snapping while in contact with said tubular member 10.

In the preferred embodiment, said decoy cords 2 each comprise a first end 3 and a second end 4. In the preferred embodiment of the present invention, attachment device 30 attachably connects to both said first end 3 and said second end 4 of said decoy cords 2, wherein a first end 3 of said decoy cord 2 is attachably connected to said decoy 1 and a second end 4 of said decoy cord 2 is used to attachably connect to said attachment anchor point 15 on said tubular member 10 of said waterfowl decoy tubular apparatus 10 of the present invention. As such, said second end 4 of each of said decoy cords 2 attachably connects to said attachment bore 15 located on said outer surface 13 of said tubular member 10 of said waterfowl decoy tubular 100 of the present invention by way of said attachment device 30.

Still referring to FIG. 4, said second end 22 of said cord member 20 is able to securely and attachably connect to said decoy cords 2 by way of said attachment device 30, whereby said attachment device 30 on second end 22 of cord member 20 is able to securely fasten around said plurality of decoy cords 2, thereby holding said decoy cords 2 together in a substantially unified and secure manner. Although not depicted in FIG. 4, said first end 21 of said cord member 20 is then axially pulled in an outwardly direction from said waterfowl decoy tubular apparatus 100, thereby pulling said cord member 20 through interior channel 16 of tubular member 10. Said first end 21 of said cord member 20 is then axially pulled out of said second end 12 of said tubular member 10, and thus said decoys 1, are pulled up to and are positioned against said first end 11 of said tubular member 10 in a substantially taught and tight manner. As a result, said decoys 1 are able to remain in a substantially extended and secure orientation, while said decoy cords 2 are encompassed and folded within said interior channel 16 of said tubular member 10.

Referring back to FIG. 3, FIG. 3 depicts a detailed side view of a preferred embodiment of a second end 12 of tubular member 10 of said waterfowl decoy tubular apparatus 100 of the present invention. Said second end 12 of said tubular member 10 comprises a substantially conical configuration, having a keyhole like opening 17. Said keyhole opening 17 and conical configuration help create and maintain said locking mechanism for said cord member 20, wherein said locking mechanism creates tension in said cord member 20, thereby allowing said cord member 20 to remain substantially tight and secure.

Said first end 21 of said cord member 20 is axially pulled in an outwardly direction from said waterfowl decoy tubular apparatus 100, and thus, said cord member 20 is able to be axially extended within said interior channel 16 of said tubular member 10. As depicted in FIG. 3, said first end 21 of said cord member 20 is able to exit said second end 12 of said tubular member 10, and then, depending on a length of said decoy cords 2, said second end 22 of said cord member 20 is able to pull said decoy cords 2 through said first end 11 of said tubular member 10 and into said interior channel 16 as far as possible in order to create a tight and secure hold on said decoy cords 2, and thus said decoys 1. As such, and as illustrated in FIG. 3, said cord member 20 is then able to hook and secure within said keyhole opening 17 of said second end 12 of said tubular member 10, thereby creating said locking mechanism, and thus, holding said cord member 20 and said decoy cords 2 in a secure, tight, and organized manner. As a result, said cord member 20 remains locked and said decoys 1 are able to remain in a substantially extended and secure orientation, while said decoy cords 2 are encompassed and folded within said interior channel 16 of said tubular member 10.

Figure 5:
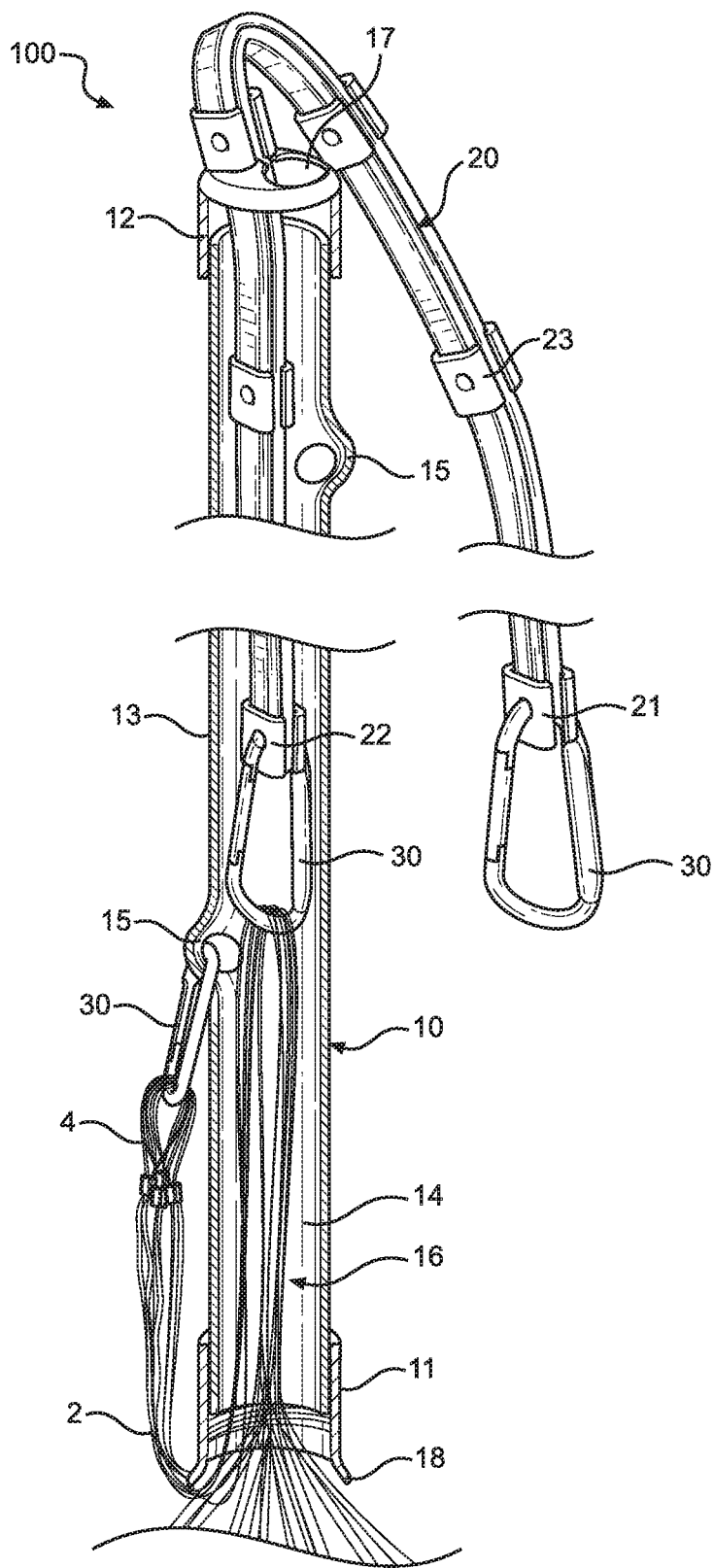
FIG. 5 depicts a longitudinal sectional view of a preferred embodiment of a waterfowl decoy tubular apparatus of the present invention.

FIG. 5 depicts a longitudinal sectional view of a preferred embodiment of said waterfowl decoy tubular apparatus 100 of the present invention, generally comprising said tubular member 10 and said cord member 20, wherein said cord member 20 facilitates in keeping said decoys 1 and said decoy cords 2 in an organized and tangle-free manner.

Said second end 22 of said cord member 20 comprises an attachment device 30, wherein said attachment device 30 securely attaches and connects to said decoy cords 2. As said first end 21 of said cord member 20 is axially extended throughout interior channel 16 and exits said second end 12 of said tubular member 10, said second end 22 of said cord member 20 enters into said first end 11 of said tubular member 10 with said decoy cords 2. Said decoy cords 2 are then axially pulled into interior channel 16 of tubular member 10, and thus, are folded within said interior channel 16 in an organized manner. Said decoy cords 2 are able to be folded up to one-third (⅓) of their original length within interior channel 16 of tubular member 10, thereby consolidating and compacting said decoy cords 2 and thus said decoys 1.

Once said decoys 1 are pulled and secured against said first end 11 of said tubular member 10 and said decoy cords 2 are properly folded and secured within interior channel 16, said cord member 20 is then tightened and locked within keyhole opening 17 of second end 12 of tubular member 10, thereby creating a substantially constant tensional force acting upon said cord member 20 in response to axial extension, and thus, keeping said decoy cords 2 in a structured configuration. As a result, the tensional force that is created in said cord member 20 helps to keep the decoy cords 2, and ultimately the decoys 1, secure and free from twisting, regardless of the length of the decoy cords 2. Thus, said decoys 1 are able to remain in a substantially extended and secure orientation, while said decoy cords 2 are encompassed and folded within said interior channel 16 of said tubular member 10.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A method of transporting and storing at least one waterfowl decoy, comprising:
   a) attachably connecting one end of at least one waterfowl decoy cable to a waterfowl decoy tubular apparatus, wherein said waterfowl decoy tubular apparatus comprises:
      i) a tubular member having a first end, a second end, an inner surface, and an outer surface, wherein said first end, said second end, said inner surface, and said outer surface cooperate to define an interior channel, and wherein said outer surface comprises a plurality of attachment anchor points;
      ii) an elongate elastic cord member having a first end, a second end, and a plurality of knots, wherein said elongate elastic cord member generates a substantially constant tensional force in response to axial extension, and wherein said elongate elastic cord member is received within said interior channel of said tubular member;
      iii) at least one attachment device that attachably connects at least one waterfowl decoy cable to one of said attachment anchor points located on said tubular member; and, iv) at least one attachment device that is located on said second end of said elastic cord member and that attachably connects at least one waterfowl decoy cable to said elastic cord member;
   b) attachably connecting at least one attachment device that is located on said second end of said elastic cord member to said waterfowl decoy cable;
   c) pulling said first end of said elastic cord member through said second end of said tubular member, thereby axially extending said elastic cord member through said interior channel of said tubular member;
   d) pulling said waterfowl decoy cable through said interior channel of said tubular member, thereby allowing said waterfowl decoy cable to fold throughout said interior channel of said tubular member, wherein said waterfowl decoy cable remains untwisted and untangled within said interior channel of said tubular member because of the elasticity and stretch of said elastic cord member; and,
   e) securely fastening said elastic cord member through said second end of said tubular member by way of securing said knots of said elastic cord member through a keyhole shaped opening in said second end of said tubular member.

2. The method of claim 1, wherein each of said attachment anchor points each comprise a through bore.

3. The method of claim 2, wherein said second end of said tubular member comprises said substantially keyhole shaped opening.

4. The method of claim 3, further comprising a locking mechanism, wherein said locking mechanism comprises said knots of said elastic cord member securely locking said elastic cord member into place through said keyhole shaped opening of said second end of said tubular member.

5. The method of claim 4, wherein said locking mechanism and said tensional force of said elastic cord member generate a secure hold on said waterfowl decoy cable within said interior channel of said tubular member and said waterfowl decoy against said first end of said tubular member, thereby allowing said waterfowl decoy cable to remain untwisted and untangled within said interior channel of said tubular member because of the elasticity and stretch of said elastic cord member.

* * * * *